J. S. & W. WALLACE.
HORSE COLLAR.
APPLICATION FILED APR. 4, 1910.
986,331.
Patented Mar. 7, 1911.
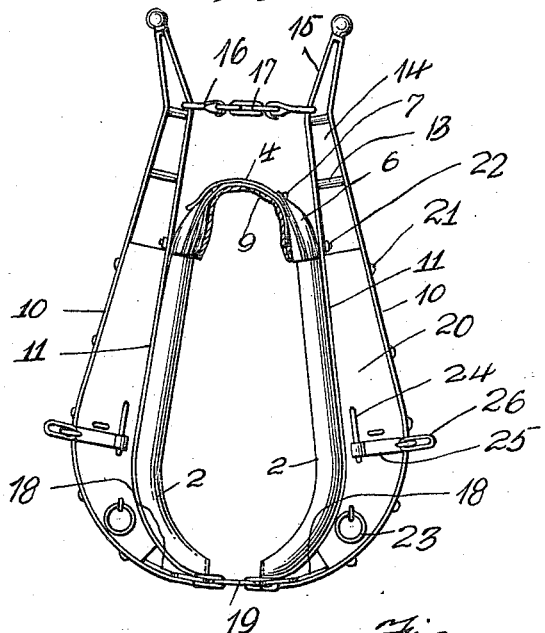
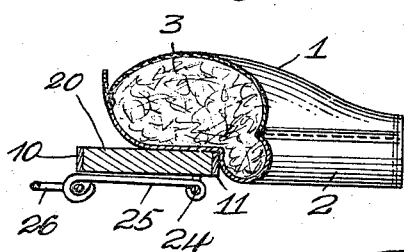
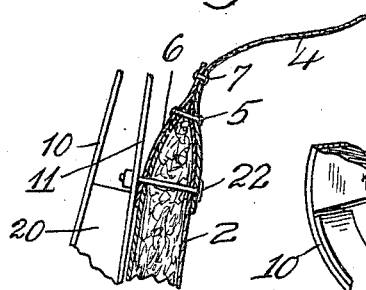
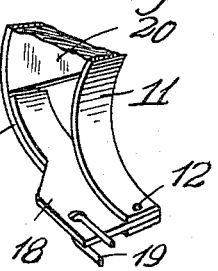
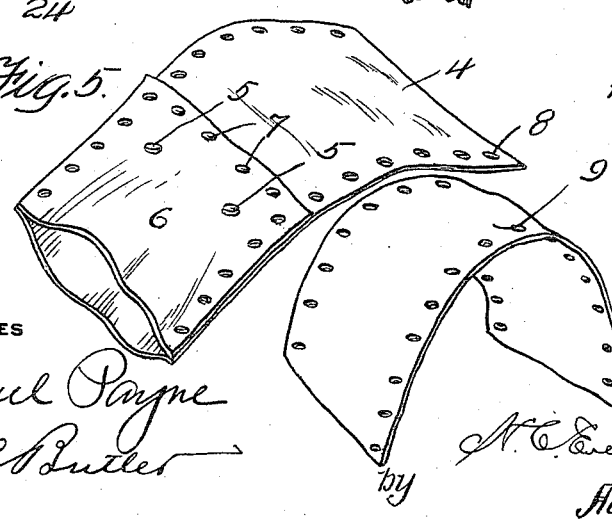
WITNESSES
Samuel Payne
R. H. Butler
INVENTORS
J. S. Wallace,
W. Wallace,
by N. C. Everett
Attorneys.

UNITED STATES PATENT OFFICE.

JOHN S. WALLACE AND WASHINGTON WALLACE, OF HOPEWELL TOWNSHIP, BEAVER COUNTY, PENNSYLVANIA.

HORSE-COLLAR.

986,331.     Specification of Letters Patent.     Patented Mar. 7, 1911.

Application filed April 4, 1910. Serial No. 553,382.

*To all whom it may concern:*

Be it known that we, JOHN S. WALLACE and WASHINGTON WALLACE, citizens of the United States of America, residing in Hopewell township, in the county of Beaver and State of Pennsylvania, have invented certain new and useful Improvements in Horse-Collars, of which the following is a specification, reference being had therein to the accompanying drawing.

This invention relates to horse collars, and more particularly to hames adapted to form part of the collar.

The primary object of our invention is to furnish a horse collar with novel hames that will remove the pressure from a horse's neck and thus prevent the neck from being injured by the pressure heretofore brought to bear upon the horse's neck by the hames resting directly upon the upper part of the collar.

Another object of our invention is to provide a strong and durable pair of hames that can be easily and quickly placed in position upon a collar, and to which the traces or tugs can be easily connected.

With the above and such other objects in view as may hereinafter appear, the invention consists of the novel construction, combination and arrangement of parts to be hereinafter specifically described and then claimed.

Reference will now be had to the drawing forming a part of this specification and wherein like reference characters denote corresponding parts throughout the several views.

In the drawing:—Figure 1 is a front elevation of a horse collar constructed in accordance with our invention, Fig. 2 is an enlarged cross sectional view of the same, Fig. 3 is an enlarged vertical sectional view of a portion of the collar, Fig. 4 is a perspective view of a portion of a hame, and Fig. 5 is a perspective view of a neck piece adapted to form part of the collar.

The horse collar comprises two curved and tapering sections or bodies 1 made of leather or other material connected together at one end and each having its inner portion formed with an extension in the form of a roll 2 which is made of a similar material, said bodies and said rolls being stuffed with hair or other matter 3 to retain the bodies and rolls in shape. The upper ends of the bodies are connected by a strap 4, the ends of the strap being secured to the bodies by rivets 5 and reinforcing pieces 6 riveted or otherwise connected to the strap 4, as at 7. The strap 4 and the edges of the reinforcing pieces 6 are apertured, as at 8 whereby a pad 9 can be laced or otherwise connected to the strap 4.

The hames consist of metallic curved straps 10 and 11, the straps of each hame having the ends thereof connected by rivets 12 and 13, the rivets 13 being spaced apart to provide an opening 14 between the straps 10 and 11, and these openings can be used for reins if it is so desired. The upper ends of the straps 10 and 11 terminate in horns 15 having snap-hooks 16 adapted to be connected to a chain 17. Mounted between the lower ends of the straps 10 and 11 are apertured plates 18 and these plates are adapted to be connected by a chain 19.

Mounted between the straps 10 and 11 are curved spacing members or plates 20 preferably made of wood and these plates are held between the straps by rivets or other fastening means 21, while the straps 11 are held in engagement with the collar by rivets or other fastening means 22. Each of the spacing members 20 is of less length than the length of each pair of straps and terminates at a point removed from the upper and from the lower end of its respective pair of straps.

The front side of the plates 20 are provided with pivoted links 23 for backing straps (not shown) and with staples 24 to which are loosely connected straps 25 and links 26 adapted to receive the traces or tugs of the harness.

From the foregoing it will be observed that the collar can be easily placed upon the horse's neck and the hames placed in engagement therewith and supported upon the collar without necessarily resting upon the strap 4 of the collar, and that by making the hames of metallic straps with wooden inserts the weight of the hames is materially decreased.

Having now described our invention what we claim as new, is:—

The combination with a horse collar formed of two curved tapering sections connected together at one end and each having its inner portion formed with an extension in the form of a roll, of a hame seated against each of the sections and abutting against the roll, each of said hames comprising a pair of opposing metallic straps, spacing members interposed between each pair of straps, and of a length less than the length of each pair of straps, each of said spacing members terminating at a point removed from the upper end of its respective pair and at a point removed from the lower end of its respective pair of straps, means for spacing the straps of each pair apart above the spacing members, a plate secured between the lower ends of each pair of straps and projecting laterally therefrom, means connected with the plates for coupling the lower ends of the hames together, and means for securing the inner strap of each pair to one of the sections of the collar.

In testimony whereof we affix our signatures in the presence of two witnesses.

JOHN S. WALLACE.
WASHINGTON WALLACE.

Witnesses:
MAX H. SROLOVITZ,
K. H. BUTLER.

---

Copies of this patent may be obtained for five cents each, by addressing the "Commissioner of Patents, Washington, D. C."